United States Patent [19]
Beyerlein et al.

[11] Patent Number: 5,719,757
[45] Date of Patent: Feb. 17, 1998

[54] THREE-PHASE RECTIFIER CIRCUIT HAVING CAPACITORS WHICH ARE SWITCHED INTO THE CIRCUIT DEPENDENT ON THE RECTIFIER OUTPUT VOLTAGE

[75] Inventors: Walter Beyerlein, Bubenreuth; Claus Bieder, Nuremberg; Peter Tichy, Uttenreuth, all of Germany

[73] Assignee: Siemens Aktiengesellschaft, Munich, Germany

[21] Appl. No.: 699,939

[22] Filed: Aug. 20, 1996

[30] Foreign Application Priority Data

Sep. 11, 1995 [DE] Germany .......... 195 33 556.2

[51] Int. Cl.⁶ .............. H02J 3/18; H02H 7/125; G05F 5/00
[52] U.S. Cl. .............. 363/34; 363/52; 323/211
[58] Field of Search .............. 323/209, 210, 323/211, 205; 363/34, 51, 52, 55

[56] References Cited

U.S. PATENT DOCUMENTS

| | | | |
|---|---|---|---|
| 4,434,358 | 2/1984 | Apfelbech et al. | 219/501 |
| 4,677,364 | 6/1987 | Williams et al. | 322/47 |
| 4,769,587 | 9/1988 | Pettigrew | 323/209 |
| 5,367,197 | 11/1994 | Klerfors | 307/105 |
| 5,402,058 | 3/1995 | Larsen | 323/211 |
| 5,434,497 | 7/1995 | Larsen | 323/209 |

FOREIGN PATENT DOCUMENTS

| | | |
|---|---|---|
| OS 44 30 394 | 1/1995 | Germany . |
| 656 753 | 7/1986 | Switzerland . |

*Primary Examiner*—Adolf Berhane
*Attorney, Agent, or Firm*—Hill, Steadman & Simpson

[57] ABSTRACT

A three-phase rectifier circuit for a capacitive load wherein only small current harmonics occur has, at the rectifier input, an inductance and a capacitor arrangement that compensates the reactive power of the inductance. The capacitors can be individually switchable, for the regulation of the rectifier output voltage.

7 Claims, 2 Drawing Sheets

THREE-PHASE RECTIFIER CIRCUIT HAVING CAPACITORS WHICH ARE SWITCHED INTO THE CIRCUIT DEPENDENT ON THE RECTIFIER OUTPUT VOLTAGE

BACKGROUND OF THE INVENTION

1. Field of the Invention

The present invention is directed to a three-phase rectifier circuit, of the type having a capacitive load which is decoupled from the network via an inductance. As used herein, "network" means the mains or power grid of an electric utility.

2. Description of the Prior Art

Three-phase rectifier circuits having capacitive loads are decoupled from the network with an inductance for reducing current harmonics. New standards require a drastic reduction in the permissible current harmonics. For this purpose, a relatively large inductance is required. The smaller the current harmonics, the larger the inductance must be.

The consequence is that the rectifier output voltage exhibits a larger swing in dependence on the load, due to the voltage drop at the inductance, and the circuit exchanges inductive reactive power with the network to an increased degree. At high inductance values, operation is no longer possible, since the power required by the load can no longer be transferred via the inductance. A collapse of the rectifier output voltage leads in this case, given a constant load, to an increase in the network current, which again causes a higher voltage drop at the inductance. This positive feedback system reaches no stable operating point, and the rectifier voltage falls continuously.

In Swiss Patent 656 753, a three-phase rectifier circuit is disclosed having a capacitive load and connected via an inductance to the network input, with capacitors being connected in parallel with the network input, the capacitance values of the capacitors being dimensioned according to the power factor and/or the desired intermediate circuit voltage. In this rectifier circuit, harmonics are reduced and the power factor is increased. In German OS 44 30 394, a three-phase rectifier circuit with regulated output direct voltage and a reduction of harmonics is disclosed, in which capacitors are provided at the input in a star circuit. In P. Mehta et al., "Switched-Capacitor Filters," in IEEE Transactions on Power Electronics, vol. 5, no. 3, July 1990, pages 331 to 336, it is discussed that in rectifier circuits AC-side capacitors can be switched for the reduction of harmonics.

SUMMARY OF THE INVENTION

An object of the present invention is to provide a three-phase rectifier circuit wherein only small current harmonics occur at the necessary inductance between the network and the rectifier input, and at the same time the possibility of setting the intermediate circuit voltage is created.

The above object is achieved in accordance with the principles of the present invention in a three-phase rectifier circuit having a capacitive load and an inductance at the network input, with capacitors being connected in parallel with the network input, such as in a star or a delta circuit, and wherein the capacitance values are dimensioned dependent on the power factor and/or on the desired intermediate circuit voltage, with the capacitors being individually switchable by a switching unit, the switching of the capacitors ensuing dependent on the rectifier output voltage.

DESCRIPTION OF THE PREFERRED EMBODIMENTS

Figure 1:
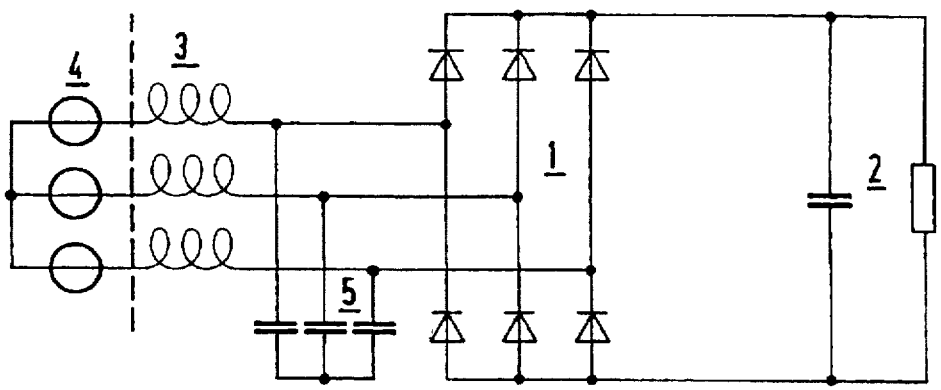
FIGS. 1, 2 and 3 respectively show three three-phase rectifier circuits that representative of the prior art, for explaining the basic idea of the invention.

FIG. 1 shows a three-phase rectifier circuit 1, having an output connected to a capacitive load 2 and an input connected with a network 4 via an inductance 3 that lies in the three supply conductors. For the compensation of the reactive power, capacitors 5 are provided in a star circuit at the input to the rectifier.

Figure 2:
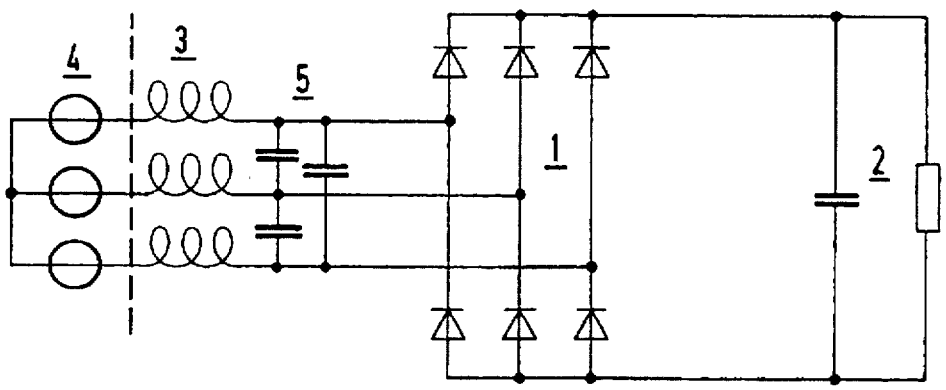

FIG. 2 shows the capacitors 5 in a delta circuit.

Figure 3:
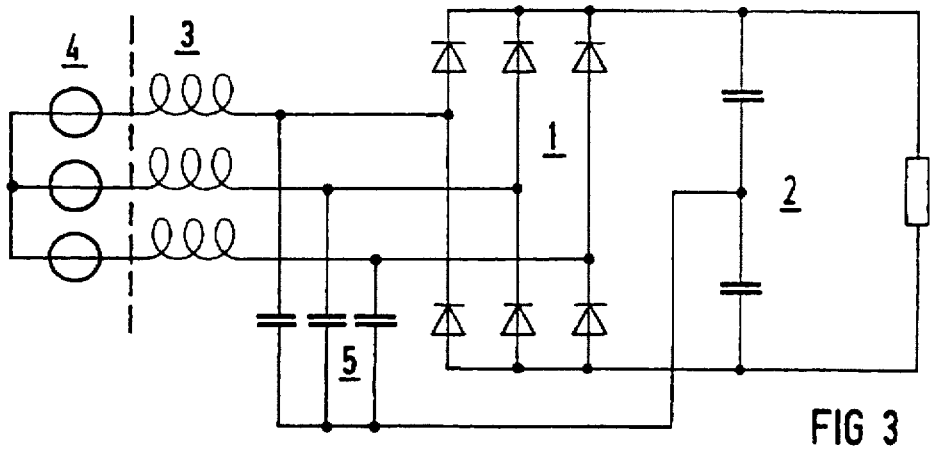

FIG. 3 shows that the star point or neutral point of the capacitors 5 is conducted to the connection point of two capacitors of the load 2 at the rectifier output.

With the rectifier circuits shown, operation is again possible, even at higher inductance values. In the adapted operating point, the circuit absorbs only effective power, and distortive power only to a small degree; reactive power of the inductance is compensated. The fundamentals of the network current and the network voltage are in phase.

The rectifier output voltage is reduced at higher absorbed inductive reactive power. With the help of the commutation capacitance of the capacitors 5, the absorbed inductive reactive power is reduced or compensated, and the stable final value of the rectifier output voltage at the load is thereby set. An increase in the capacitance of the capacitors 5 effects an increase in the output voltage.

If the emitted power is measured, an optimum compensation can be achieved by means of the connection and disconnection of capacitors of different sizes.

Figure 4:
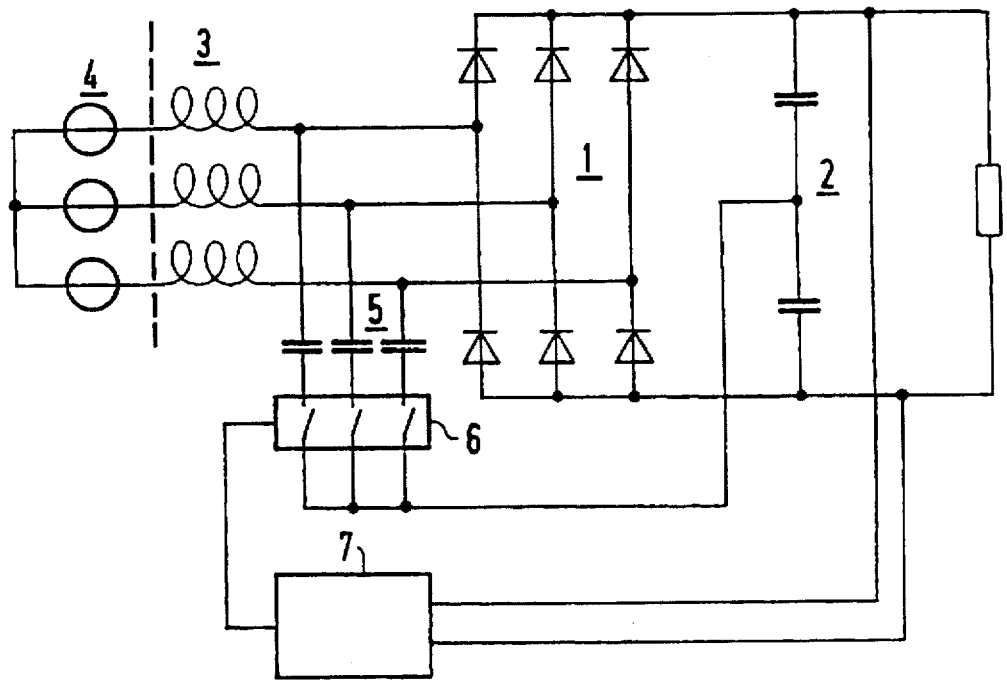
FIGS. 4 and 5 respectively show two three-phase rectifier circuits according to the invention.

FIG. 4 shows that the capacitors 5 can be individually connected and disconnected via a switching apparatus 6. The switching apparatus 6 is driven by a voltage control unit 7 for the rectifier output voltage.

Figure 5:
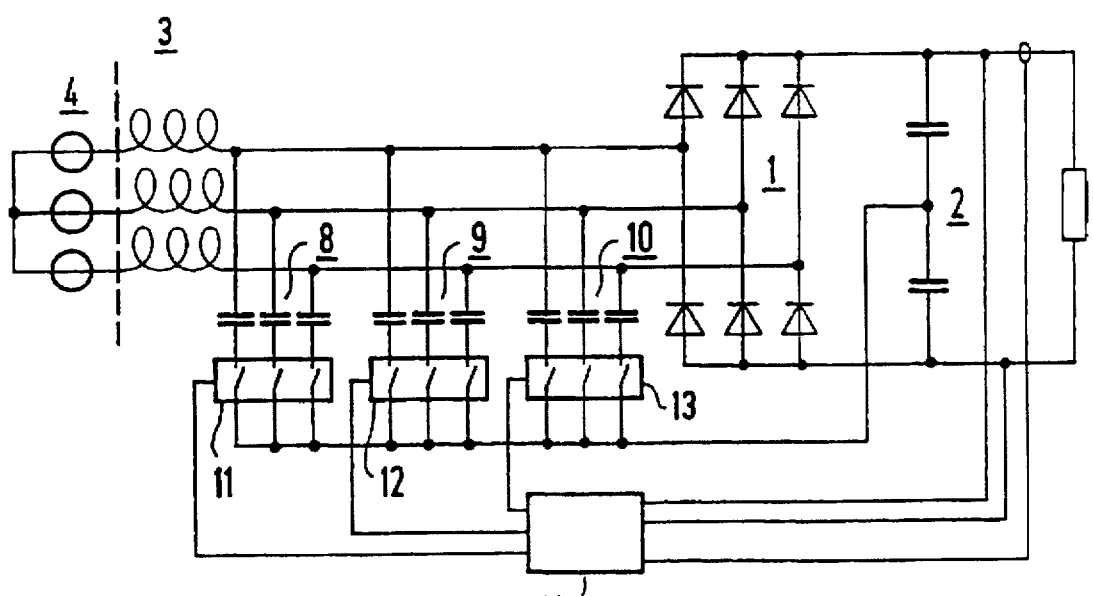

FIG. 5 shows an expansion of the circuit arrangement according to FIG. 4, having three groups of capacitors 8, 9 and 10, which are individually driven by three switching apparatuses 11, 12 and 13. A voltage control unit 14, having a power control for driving the control apparatuses 11, 12 and 13, is also provided.

The connecting of the capacitors 5, 8, 9 and 10 in FIGS. 4 and 5 can also ensue dependent on the power drawn, in addition to regulating the rectifier output voltage.

The invention is particularly suited for use in a high-frequency X-ray generator, in which the rectifier output voltage is the input voltage of the inverter that supplies a high-voltage transformer. The X-ray tube lies at the output of the high-voltage transformer.

The effective capacitance can be varied by connection and disconnection dependent on the load, phase angle variation (controlled by the network) or pulse width modulation (self-controlled).

Although modifications and changes may be suggested by those skilled in the art, it is the intention of the inventors to embody within the patent warranted hereon all changes and modifications as reasonably and properly come within the scope of their contribution to the art.

We claim as our invention:

1. In a three-phase rectifier circuit connectable to a network at a network input and having a capacitive load and an inductance at the network input, and having a plurality of capacitors connected in parallel with the network input, said three phase rectifier circuit having a rectifier output voltage, a power factor and a desired intermediate circuit voltage associated therewith, said capacitors having respective capacitance values dimensioned dependent on at least one of the power factor and the desired intermediate circuit voltage, the improvement comprising:

said capacitors being individually switchable; and voltage control means for individually switching said capacitors dependent on said rectifier output voltage, or dependent on the power drawn.

2. The improvement of claim 1, wherein said capacitors are connected in a star circuit having a star point connected to a connection point of two of said capacitors at a rectifier output.

3. The improvement of claim 1, wherein said capacitors are connected in a delta circuit.

4. The improvement of claim 1, wherein said plurality of capacitors comprise a plurality of groups of capacitors.

5. The improvement of claim 1, wherein said voltage control means comprise means for switching said capacitors to provide an effective capacitance by connecting and disconnecting said capacitors dependent on the load.

6. The improvement of claim 1, wherein said voltage control means comprise means for switching said capacitors to produce an effective capacitance dependent on a network-controlled phase.

7. The improvement of claim 1, wherein said voltage control means comprise means for switching said capacitors to produce an effective capacitance by pulse width modulation.

* * * * *